UNITED STATES PATENT OFFICE.

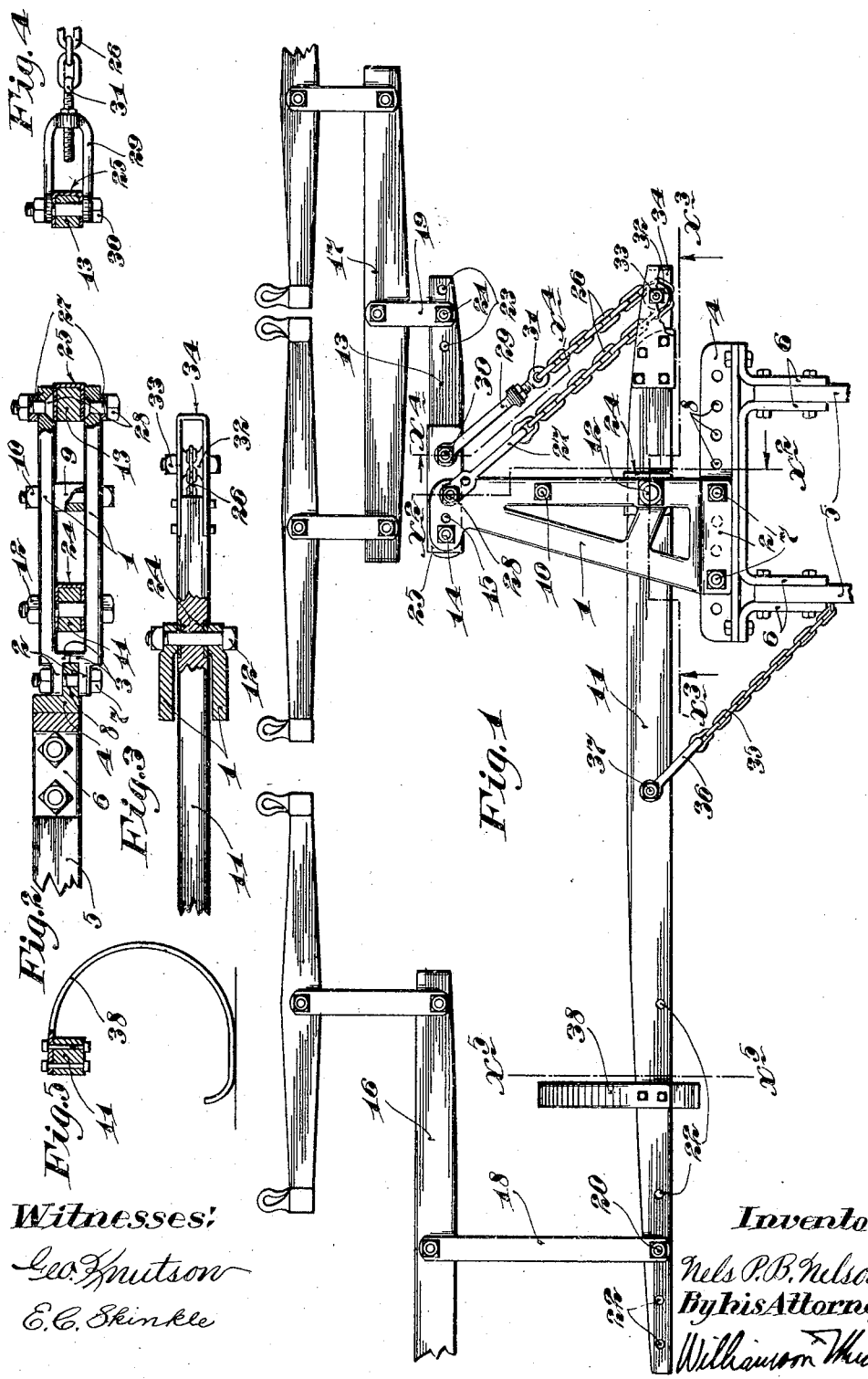

NELS P. B. NELSON, OF BRADDOCK, NORTH DAKOTA.

DRAFT-EQUALIZER.

1,118,911.   Specification of Letters Patent.   Patented Nov. 24, 1914.

Application filed August 14, 1913. Serial No. 784,734.

*To all whom it may concern:*

Be it known that I, NELS P. B. NELSON, a citizen of the United States, residing at Braddock, in the county of Emmons and State of North Dakota, have invented certain new and useful Improvements in Draft-Equalizers; and I do hereby declare the following to be a full, clear, and exact description of the invention, such as will enable others skilled in the art to which it appertains to make and use the same.

My invention has for its object to provide an improved draft equalizer and, to this end, it consists of the novel devices and combinations of devices hereinafter described and defined in the claims.

In the drawings, the device is shown as a four-horse equalizer arranged to permit the horses to be driven abreast, but the principles of construction involved therein may be incorporated in draft equalizers of different horse capacity.

In the accompanying drawings, which illustrate the invention, like characters indicate like parts throughout the several views.

Referring to the drawings: Figure 1 is a plan view of the draft equalizer; Fig. 2 is a vertical section, taken on the line $x^2$ $x^2$ of Fig. 1; Fig. 3 is a vertical section, taken on the irregular line $x^3$ $x^3$ of Fig. 1; Fig. 4 is a detail view of the connection between the main and supplemental equalizing levers, some parts being sectioned on the line $x^4$ $x^4$ of Fig. 1; and Fig. 5 is a detail view of the ground engaging shoe, some parts being sectioned on the line $x^5$ $x^5$ of Fig. 1.

This improved draft equalizer is adapted for use in connection with different kinds of vehicles and portable machinery, such as wagons and harvesters, but, as shown, it is especially designed to be connected to sulky or gang plows with the draft strain equally distributed among the several horses. With this arrangement, the horses walk abreast, with only one in the furrow and the others on the "land".

Of the parts of the improved draft equalizer, the numeral 1 indicates a pair of parallel, vertically spaced metallic brackets having, at their rear ends, parallel, vertically spaced anchor flanges 2 and inwardly projecting spacing flanges 3. The spacing flanges 3 are engageable one with the other, to properly space the brackets 1, and the anchor flanges 2 embrace the horizontal flange of a transverse horizontal angle bar 4. This bar 4 is rigidly secured to a plow frame 5 by angle brackets 6. The brackets 1 are secured to the bar 4, for different lateral adjustments thereon, by nut equipped bolts 7 passed through vertically alined perforations in the flanges 2 and through longitudinally spaced perforations 8 in the horizontal flange of the bar 4. The perforations 8 extend from end to end of the bar 4 and permit various adjustments of the brackets 1 with respect to the bar 4, in order to secure the proper line of draft. A spacing thimble 9 is inserted between the outer end portions of the brackets 1 and is secured thereto by a nut equipped bolt 10 passed through said thimble and brackets.

A relatively long main equalizing lever 11 is extended transversely between the brackets 1 and is intermediately pivoted thereto, by a nut equipped bolt 12. The long end of the main equalizing lever 11 extends outward or away from the formed furrow. Substantially parallel with the main equalizing lever 11 is a relatively short supplemental equalizing lever 13, one end of which projects between the forward ends of the brackets 1 and is secured thereto, for longitudinal adjustment, by a nut equipped bolt 14 adapted to be passed through any one pair of vertically alined perforations 15 formed in the brackets 1.

Two horse eveners 16 and 17 are secured, respectively, to the long end of the main equalizing lever 11 and to the inner end of the supplemental equalizing lever 13. The eveners 16 and 17 are provided, respectively, with rearwardly projecting, relatively long and short links 18 and 19. The links 18 and 19 are secured, respectively, to the main equalizing lever 11 and supplemental equalizing lever 13, by nut equipped bolts 20 and 21 passed through perforations in said links and through any one of a plurality of longitudinally spaced perforations 22 and 23 formed, respectively, in the main and supplemental equalizing levers. By longitudinally adjusting the eveners 16 and 17 on the main and supplemental equalizing levers, the entire draft strain may be equalized between the four horses. U-shape wearing plates 24 and 25, respectively, embrace the main and supplemental equalizing levers 11 and 13, at points where they are attached to the brackets 1.

The supplemental equalizing lever 13 is connected to the short end of the main equalizing lever 11 by a power multiplying cable in the form of a chain 26. One end of this chain 26 is attached to the forward ends of the brackets 1 by a clevis 27, the prongs of which embrace said brackets and are pivotally secured thereto by short nut equipped bolts 28 having their heads countersunk in the inner faces of the brackets 1, as best shown in Fig. 2. The other end of the chain 26 is attached to the intermediate portion of the supplemental equalizing lever 13 by a clevis 29, the prongs of which embrace the said lever and are pivotally secured thereto by a nut equipped bolt 30. As shown, the wearing plate 25 is extended between the prongs of the clevis 29. To permit longitudinal adjustment of the cable 26, the same is connected to the clevis 29 by an eye bolt 31 having screw threaded engagement with the transverse portion of said clevis. The intermediate portion of the cable 26 is arranged to run over a grooved roller 32 journaled at 33 to the prongs of a U-shaped metal plate 34 which embrace the short end of the main equalizing lever 11 and are rigidly bolted thereto.

A flexible cable 35, in the form of a chain, is provided to limit the forward swinging movement of the long end of the lever 11 and thereby prevent one team from pulling too far ahead of the other. The rear end of this cable 35 is secured to the plow frame 5 and the forward end thereof is secured to a clevis 36, the prongs of which embrace the main equalizing lever 11 and are pivotally secured thereto by a bolt 37. A ground engaging shoe 38, preferably constructed of spring metal, is attached to the long end of the equalizing lever 11 and supports the same when the horses are at rest.

What I claim is:

1. In a draft equalizer, the combination with a bracket, of a main equalizing lever intermediately pivoted to said bracket and having its long end extended outward, a supplemental equalizing lever pivoted to said bracket and extended inward, eveners applied to said main and supplemental equalizing levers for adjustment toward and from said bracket, and a cable connection secured, at one end, to said bracket and, at the other end, to the intermediate portion of said supplemental equalizing lever, the intermediate portion of said connection extending over a guide on the short end of said main equalizing lever.

2. In a draft equalizer, the combination with a bracket, of a main equalizing lever intermediately pivoted to said bracket, and having its long end extended outward, a supplemental equalizing lever pivoted to said bracket and extended inward, eveners applied to said main and supplemental levers, for adjustment toward and from said bracket, an adjustable cable connection secured, at one end, to said bracket and, at the other end, to the intermediate portion of said supplemental equalizing lever, the intermediate portion of said connection being arranged to run over a wheel equipped guide on the short end of said main equalizing lever, and a cable connection limiting the forward swinging movement of the long end of said main equalizing lever.

In testimony whereof I affix my signature in presence of two witnesses.

NELS P. B. NELSON.

Witnesses:
A. W. STOAK,
S. J. MOEN.

Copies of this patent may be obtained for five cents each, by addressing the "Commissioner of Patents, Washington, D. C."